United States Patent
Pan et al.

(10) Patent No.: US 7,876,806 B2
(45) Date of Patent: *Jan. 25, 2011

(54) ORTHOGONAL FREQUENCY DIVISION MULTIPLEXING-CODE DIVISION MULTIPLE ACCESS SYSTEM

(75) Inventors: Jung-Lin Pan, Selden, NY (US); Guodong Zhang, Farmingdale, NY (US); Yingming Tsai, Boonton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 979 days.

This patent is subject to a terminal disclaimer.

(21) Appl. No.: 11/385,168

(22) Filed: Mar. 21, 2006

(65) Prior Publication Data

US 2006/0245472 A1    Nov. 2, 2006

Related U.S. Application Data

(60) Provisional application No. 60/664,868, filed on Mar. 24, 2005, provisional application No. 60/665,442, filed on Mar. 25, 2005, provisional application No. 60/665,811, filed on Mar. 28, 2005, provisional application No. 60/666,140, filed on Mar. 29, 2005.

(51) Int. Cl.
*H04B 1/707* (2006.01)

(52) U.S. Cl. .................................. 375/130; 375/260

(58) Field of Classification Search ................ 375/260, 375/130, 140, 146, 147, 259
See application file for complete search history.

(56) References Cited

U.S. PATENT DOCUMENTS

| | | | |
|---|---|---|---|
| 7,242,722 B2 * | 7/2007 | Krauss et al. | 375/260 |
| 7,417,964 B2 | 8/2008 | Cho et al. | |
| 7,471,932 B2 | 12/2008 | Wu et al. | |
| 2002/0177447 A1 | 11/2002 | Walton et al. | |
| 2003/0081538 A1 | 5/2003 | Walton et al. | |
| 2004/0127223 A1 * | 7/2004 | Li et al. | 455/446 |
| 2004/0151145 A1 | 8/2004 | Hammerschmidt | |
| 2004/0264585 A1 * | 12/2004 | Borran et al. | 375/260 |
| 2005/0190849 A1 * | 9/2005 | McNamara | 375/267 |
| 2006/0062140 A1 | 3/2006 | Sudo | |
| 2006/0153283 A1 * | 7/2006 | Scharf et al. | 375/148 |
| 2007/0165567 A1 * | 7/2007 | Tan et al. | 370/329 |

FOREIGN PATENT DOCUMENTS

JP         2004-200856         7/2004

* cited by examiner

*Primary Examiner*—Kevin M Burd
(74) *Attorney, Agent, or Firm*—Volpe and Koenig, P.C.

(57) ABSTRACT

An orthogonal frequency division multiplexing (OFDM)-code division multiple access (CDMA) system is disclosed. The system includes a transmitter and a receiver. At the transmitter, a spreading and subcarrier mapping unit spreads an input data symbol with a complex quadratic sequence code to generate a plurality of chips and maps each chip to one of a plurality of subcarriers. An inverse discrete Fourier transform is performed on the chips mapped to the subcarriers and a cyclic prefix (CP) is inserted to an OFDM frame. A parallel-to-serial converter converts the time-domain data into a serial data stream for transmission. At the receiver, a serial-to-parallel converter converts received data into multiple received data streams and the CP is removed from the received data. A discrete Fourier transform is performed on the received data streams and equalization is performed. A despreader despreads an output of the equalizer to recover the transmitted data.

23 Claims, 6 Drawing Sheets

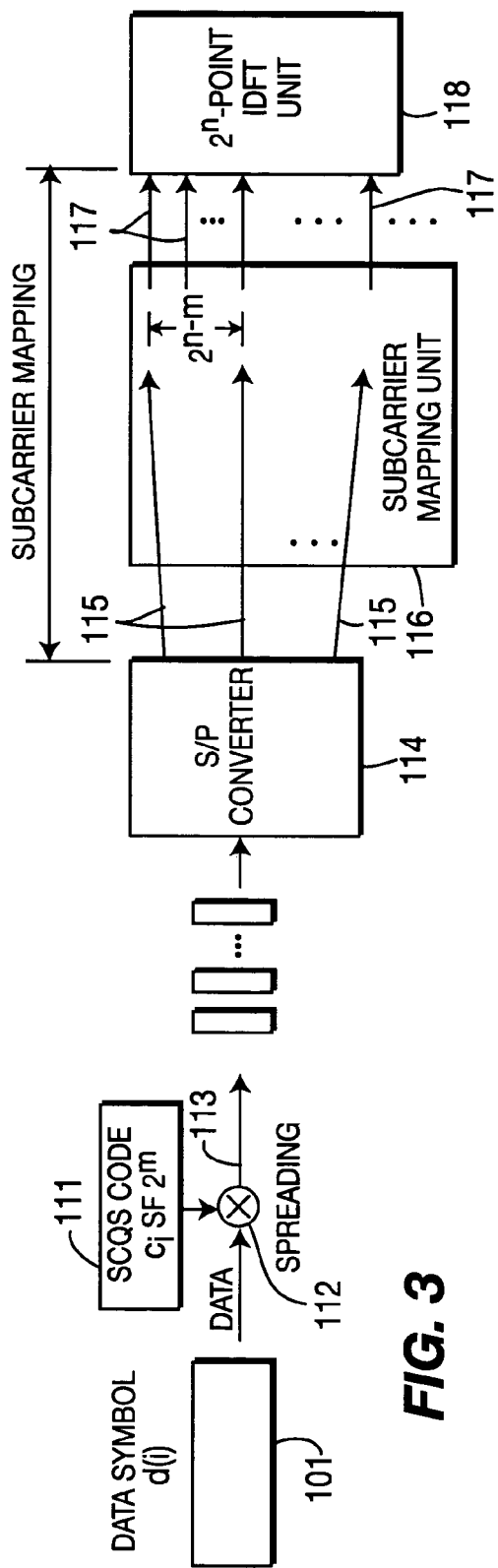
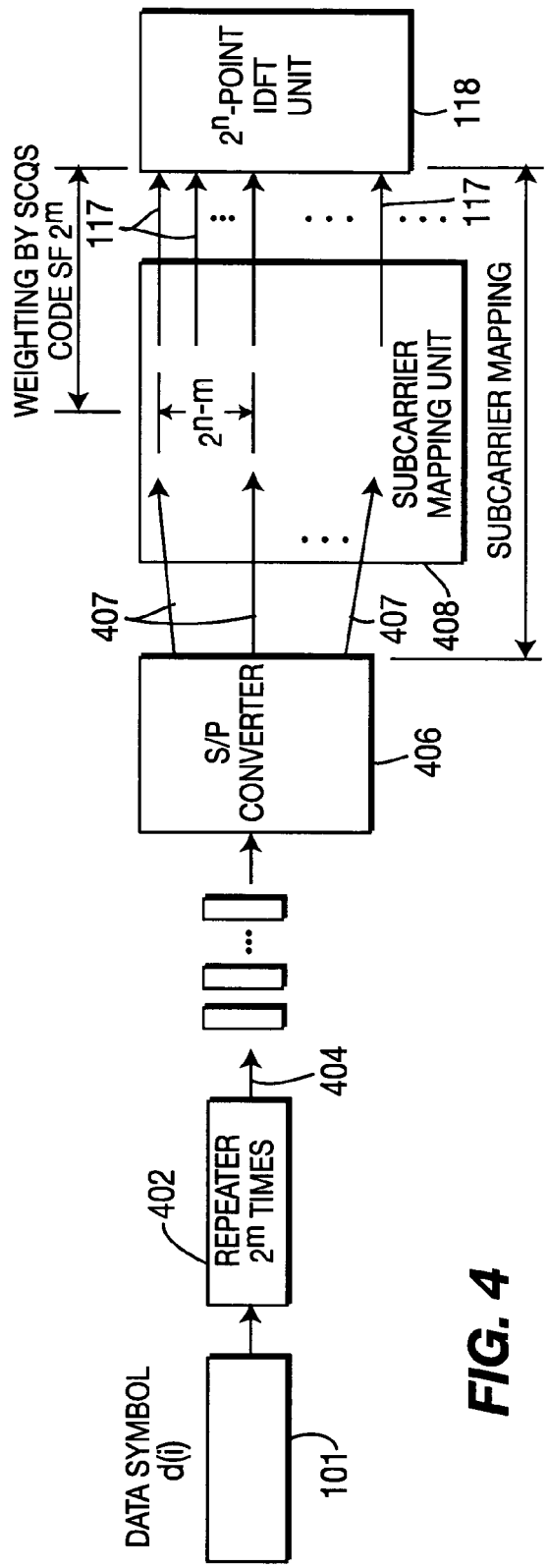
FIG. 3
FIG. 4

ORTHOGONAL FREQUENCY DIVISION MULTIPLEXING-CODE DIVISION MULTIPLE ACCESS SYSTEM

CROSS REFERENCE TO RELATED APPLICATIONS

This application claims the benefit of U.S. Provisional Application Nos. 60/664,868 filed Mar. 24, 2005, 60/665,442 filed Mar. 25, 2005, 60/665,811 filed Mar. 28, 2005 and 60/666,140 filed Mar. 29, 2005, which are incorporated by reference as if fully set forth.

FIELD OF INVENTION

The present invention is related to a wireless communication system. More particularly, the present invention is related to an orthogonal frequency division multiplexing (OFDM)-code division multiple access (CDMA) communication system.

BACKGROUND

Wireless communication networks of the future will provide broadband services such as wireless Internet access to subscribers. Those broadband services require reliable and high-rate communications over time-dispersive (frequency-selective) channels with limited spectrum and intersymbol interference (ISI) caused by multipath fading. OFDM is one of the most promising solutions for a number of reasons. OFDM has high spectral efficiency and adaptive coding and modulation can be employed across subcarriers. Implementation is simplified because the baseband modulation and demodulation can be performed using simple circuits such as inverse fast Fourier transform (IFFT) circuits and fast Fourier transform (FFT) circuits. A simple receiver structure is one of the advantages of OFDM system, since in some cases only one tap equalizer is sufficient to provide excellent robustness in multipath environment. In other cases, when OFDM is used in conjunction with signal spreading across multiple subcarriers, a more advanced equalizer may be required.

OFDM has been adopted by several standards such as Digital Audio Broadcast (DAB), Digital Audio Broadcast Terrestrial (DAB-T), IEEE 802.11a/g, IEEE 802.16 and Asymmetric Digital Subscriber Line (ADSL). OFDM is being considered for adoption in standards such as Wideband Code Division Multiple Access (WCDMA) for third generation partnership project (3GPP) long term evolution, CDMA2000, Fourth Generation (4G) wireless systems, IEEE 802.11n, IEEE 802.16, and IEEE 802.20.

Despite all of the advantages, OFDM has some disadvantages. One major disadvantage of OFDM is its inherent high peak-to-average power ratio (PAPR). The PAPR of OFDM increases as the number of subcarriers increases. When high PAPR signals are transmitted through a non-linear power amplifier, severe signal distortion will occur. Therefore, a highly linear power amplifier with power backoff is required for OFDM. As a result, the power efficiency with OFDM is low and the battery life of a mobile device implementing OFDM is limited.

Techniques for reducing the PAPR of an OFDM system have been studied extensively. These PAPR reduction techniques include coding, clipping, and filtering. The effectiveness of these methods varies and each has its own inherent trade-offs in terms of complexity, performance, and spectral efficiency.

SUMMARY

The present invention is related to an OFDM-CDMA system. The system includes a transmitter and a receiver. At the transmitter, a spreading and subcarrier mapping unit spreads an input data symbol with a spread complex quadratic sequence (SCQS) code to generate a plurality of chips and maps each chip to one of a plurality of subcarriers. An inverse discrete Fourier transform (IDFT) or IFFT unit performs IDFT or IFFT on the chips mapped to the subcarriers and a cyclic prefix (CP) is inserted to an OFDM frame. A parallel-to-serial (P/S) converter converts the time-domain data into a serial data stream for transmission. At the receiver, a serial-to-parallel (S/P) converter converts a received data into multiple received data streams and the CP is removed from the received data. A discrete Fourier transform (DFT) or FFT unit performs DFT or FFT on the received data streams and equalization is performed. A despreader despreads an output of the equalizer to recover the transmitted data.

BRIEF DESCRIPTION OF THE DRAWINGS

A more detailed understanding of the invention may be had from the following description of a preferred embodiment, given by way of example and to be understood in conjunction with the accompanying drawing wherein:

FIG. 3 shows spreading and subcarrier mapping in the system of FIG. 1;

FIG. 4 shows an alternative interpretation of the spreading and subcarrier mapping in the system of FIG. 1;

DETAILED DESCRIPTION OF THE PREFERRED EMBODIMENTS

Figure 1:
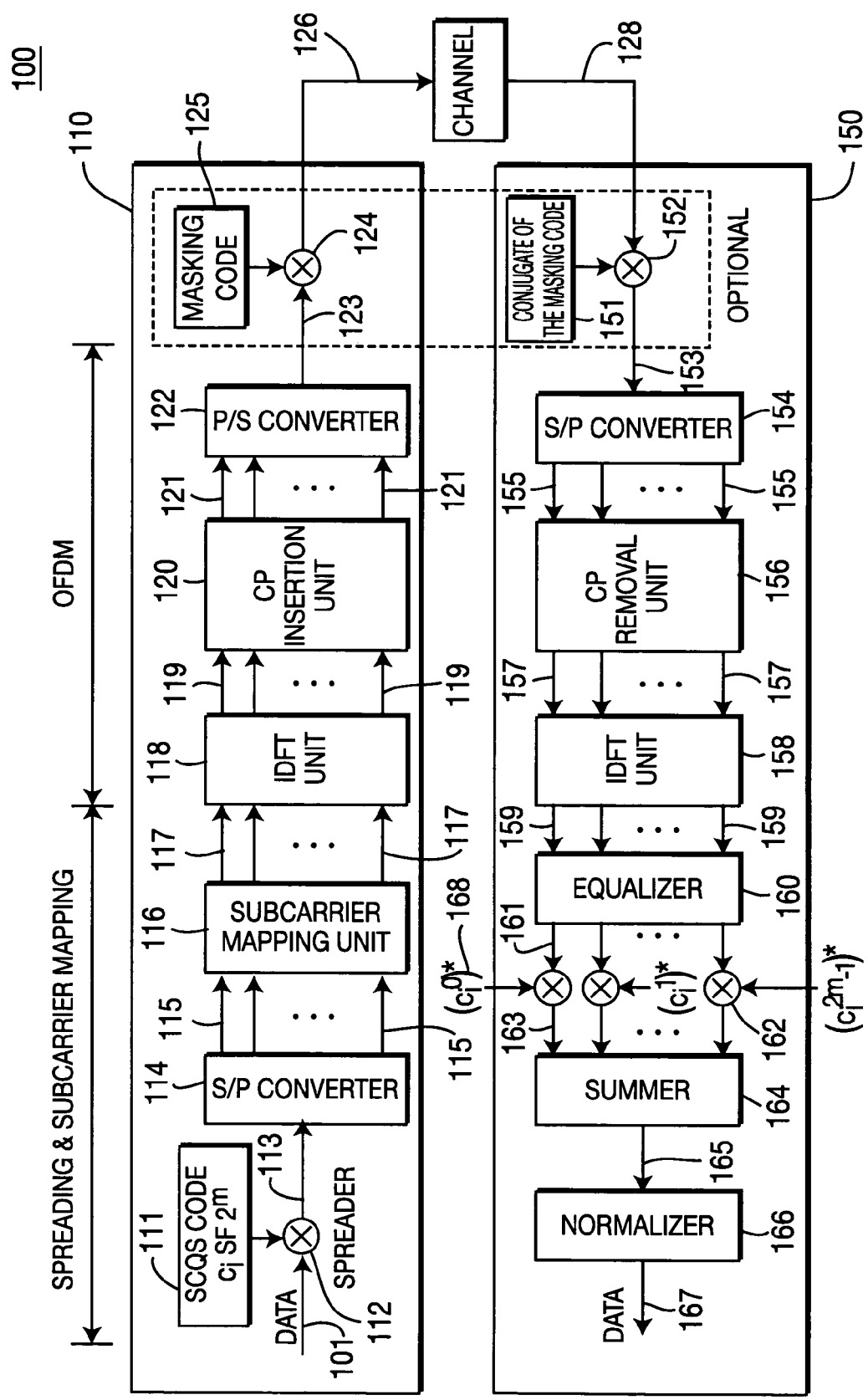
FIG. 1 is a block diagram of an OFDM-CDMA system in accordance with one embodiment of the present invention.

The present invention is applicable to wireless communication systems implementing OFDM and CDMA such as IEEE 802.11, IEEE 802.16, Third Generation (3G) cellular systems for long term evolution, Fourth Generation (4G) systems, satellite systems, DAB, digital video broadcasting (DVB), or the like.

The features of the present invention may be incorporated into an integrated circuit (IC) or be configured in a circuit comprising a multitude of interconnecting components.

The present invention provides an OFDM-CDMA system with an improved PAPR and capacity. The present invention uses a special spreading code, a SCQS code, in spreading input data symbols. The SCQS code comprises two components; a quadratic phase sequence code and an orthogonal (or pseudo-orthogonal) spreading code. Examples of the quadratic phase sequence code, denoted by G, are the Newman phase code (or polyphase code), a generalized chirp-like sequence (GCL) and a Zadoff-Chu sequence. Quadratic phase sequences are called polyphase sequences as well.

To support a variable spreading factor (VSF), the sequence length of the quadratic phase sequence (or polyphase sequence) is limited as $K=2^k$. In some special cases, (such as random access channel or uplink pilots), the sequence length of quadratic phase sequence (or polyphase sequence) can be any arbitrary integer number. Given the number of subcarriers $N=2^n$ in the system, consider a sequence length of N as an example. Then, the generic Newman phase code or polyphase code sequence is fixed. The generic Newman phase code sequence is:

$$G_k = e^{-jk^2 \frac{\pi}{N}}, k = 0, 1, \ldots, N-1.\qquad\text{Equation (1)}$$

More orthogonal Newman phase code sequences are created by shifting the generic Newman phase code sequence in phase. The l-th shifted version, (or DFT modulated), of the generic Newman polyphase code sequence is:

$$G_k^{(l)} = e^{-jk^2 \frac{\pi}{N}} \cdot e^{jkl\frac{2\pi}{N}},\qquad\text{Equation (2)}$$
$$k = 0, 1, \ldots, N-1, l = 0, 1, \ldots, N-1.$$

Two Newman phase code sequences with different shifts are orthogonal to each other.

One example of the orthogonal (or pseudo-orthogonal) spreading code, denoted by H, is Walsh-Hadamard code, which is given by:

$$H_2 = \begin{bmatrix} 1 & 1 \\ 1 & -1 \end{bmatrix};\qquad\text{Equation (3)}$$

$$H_{2^m} = \begin{bmatrix} H_{2^{m-1}} & H_{2^{m-1}} \\ H_{2^{m-1}} & -H_{2^{m-1}} \end{bmatrix}, \text{ for } m > 1.\qquad\text{Equation (4)}$$

The SCQS code is constructed by combining the quadratic phase code and the orthogonal (or pseudo-orthogonal) spreading code. For a specific spreading factor $2^m$, the SCQS code has $2^m$ chips. The generic quadratic phase sequence code part of the SCQS code has $2^m$ chips, which is:

$$\{G_i, G_{2^{n-m}+i}, \ldots, G_{2^{n-m}\cdot k+i}, \ldots, G_{2^{m-1}+i}\};\qquad\text{Equation (5)}$$

where $k=0, 1, \ldots, 2^m-1$, $i=0,1,\ldots,2^{n-m}-1$.

The l-th shifted version of the quadratic phase sequence code part has $2^m$ chips, which is:

$$\{G_i^{(l)}, G_{2^{n-m}+i}^{(l)}, \ldots, G_{2^{n-m}\cdot k+i}^{(l)}, \ldots, G_{2^{m-1}+i}^{(l)}\};\qquad\text{Equation (6)}$$

where $l=0,1,\ldots,N-1$, $k=0, 1, \ldots, 2^m-1$, $i=0,1,\ldots,2^{n-m}-1$.

For a specific SCQS code with spreading factor $2^m$, the orthogonal (or pseudo-orthogonal) spreading code part of the SCQS code is given by one of the codes in the orthogonal (or pseudo-orthogonal) spreading code set of spreading factor $2^m$. For example, the h-th code is denoted by $H_{2^m}(h,:)$.

The k-th chip of the SCQS code $c_i$ is constructed as a product of the k-th quadratic phase sequence code of the l-th shifted version of the generic quadratic phase sequence code and the k-th chip of the h-th orthogonal (or pseudo-orthogonal) spreading code with the size of $N=2^m$.

$$c_i^k = G_k^{(l)} \cdot H_{2^m}(h,k), k=0, 1, \ldots, 2^m-1.\qquad\text{Equation (7)}$$

The code set size of the SCQS code is determined by the code set dimensions of the orthogonal (or pseudo-orthogonal) spreading code part and the quadratic phase sequence code part. The code set dimension of the quadratic phase sequence code is fixed regardless of the spreading factor and is determined by the number of different shifts, which is the number of subcarriers in the system, $2^n$. The code set dimension of the orthogonal (or pseudo-orthogonal) spreading code depends on the spreading factor. For example, in the case of a Walsh-Hadamard code, the dimension equals to the spreading factor $2^m$ ($0 \leq m \leq n$).

Figure 2:
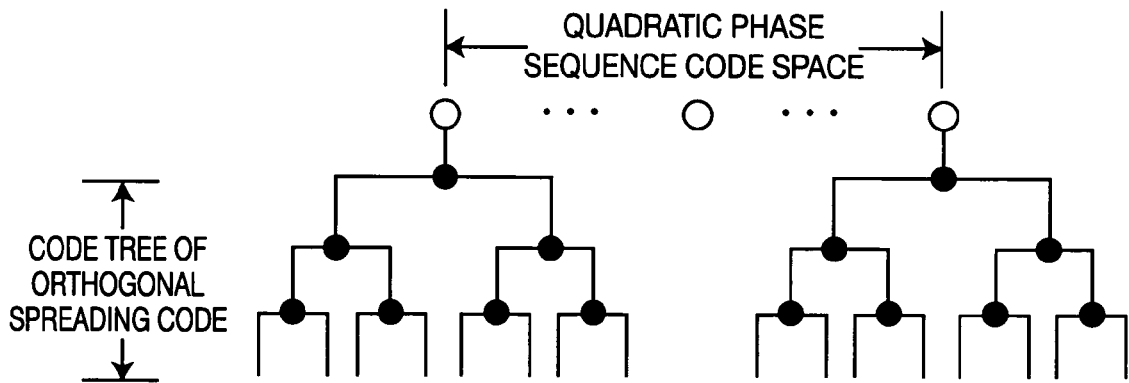
FIG. 2 shows the code set of the spread complex quadratic sequence (SCQS) code in accordance with the present invention.

Different users are assigned different SCQS codes. In order for a receiver to distinguish between different users, the SCQS codes used by two users may be different in the quadratic phase sequence code part, the orthogonal (or pseudo-orthogonal) spreading code part, or both. The code set of the SCQS code is shown in FIG. 2.

Without multipath, different SCQS codes are orthogonal as long as their quadratic phase sequence code parts are different; or an orthogonal spreading code is used. Different SCQS codes are pseudo-orthogonal only when their quadratic phase sequence code parts are the same and a pseudo-orthogonal spreading code is used. In both cases, the multiple access interference (MAI) between different codes is either zero or very small.

Under the multipath fading environment, codes assigned to different users should be such that the difference in the shift of quadratic phase sequence code part should be as large as possible. Codes assigned to different users should be such that if the difference in the shift of the quadratic phase sequence code part of two codes is not less than the maximum delay spread of the multipath channel, there is no MAI between the two codes. Therefore, the corresponding orthogonal (or pseudo-orthogonal) spreading code part can be assigned to be the same. Optionally, the difference in the shift of the quadratic phase sequence code part may be limited to be at most the maximum delay spread of the multipath channel. This will create more codes with perfect MAI immunity. This is achievable as long as the number of users in the system is no more than N/L, where N is the number of subcarriers and L is the multipath channel maximum delay spread.

If the difference in the shift of the quadratic phase sequence code part of two codes is less than the maximum delay spread of the multipath channel, the corresponding orthogonal (or pseudo-orthogonal) spreading code part should be different in order to reduce the MAI that cannot be cancelled by the difference in the shift of the quadratic phase sequence code part.

In this way, the MAI can be reduced as compared to the conventional CDMA system since the correlation between orthogonal codes is further reduced by the correlation of two quadratic phase sequence codes. For an interference-limited system (such as CDMA), reduced MAI implies increased system capacity.

An OFDM-CDMA system of the present invention comprises a transmitter and a receiver. The transmitter comprises a spreading and subcarrier mapping portion and an OFDM portion. The spreading and subcarrier mapping portion performs spreading of input data symbols into a plurality of chips and mapping of the chips to one of a plurality of subcarriers. The OFDM portion performs conventional OFDM operation.

The spreading may be performed in the frequency-domain, in the time-domain or both, which will be explained in detail hereinafter.

FIG. 1 is a block diagram of an OFDM-CDMA system 100 in accordance with a first embodiment of the present invention. The system 100 comprises a transmitter 110 and a receiver 150. The transmitter 110 comprises a spreader 112, a serial-to-parallel (S/P) converter 114, a subcarrier mapping unit 116, an IDFT unit 118, a cyclic prefix (CP) insertion unit 120, a parallel-to-serial (P/S) converter 122 and an optional mixer 124. The spreader 112 spreads input data symbols 101 in frequency-domain using the SCQS code 111. The procedure of spreading and subcarrier mapping is shown in FIG. 3. The spreading factor used by the SCQS code $c_i$ is $2^m$ ($0 \leq m \leq n$). One user can use all of $2^n$ subcarriers in the system. Therefore, the number of data symbols that can be transmitted by one user in one OFDM frame is $2^{n-m}$. Each data symbol $d(i)$ 101 is spread by the spreading code $c_i$ 111 into $2^m$ chips 113. The $2^m$ chips 113 are then converted into $2^m$ parallel chips 115 by the S/P converter 114 and each chip is mapped to one of the subcarriers 117 by the subcarrier mapping unit 116 in an equal-distance. The distance between each subcarrier used by chips of the same data symbol is $2^{n-m}$ subcarriers. Chips of different data symbols are mapped to subcarriers in the system sequentially such that the chips of data symbol $d(i)$ are mapped to subcarriers $2^{n-m} \cdot k + i$, ($k=0,1,\ldots,2^m-1$, $i=0,1,\ldots,2^{n-m}-1$).

FIG. 4 shows an alternative embodiment for spreading and subcarrier mapping. Instead of the spreader 112, a repeater 402 is used to repeat each data symbol $d(i)$ $2^m$ times at the chip rate. The repeated data symbols 404 are converted into $2^m$ parallel symbols 407 by the S/P converter 406 and each symbol is mapped to one of the $2^m$ subcarriers of equal distance by the subcarrier mapping and weighting unit 408 sequentially. The distance between each subcarrier is $2^{n-m}$ subcarriers. Chips of different data symbols are mapped to subcarriers in the system sequentially such that the chips of data symbol $d(i)$ are mapped to subcarriers $2^{n-m} \cdot k + i$, ($k=0,1,\ldots,2^m-1$, $i=0,1,\ldots,2^{n-m}-1$). A symbol mapped on each subcarrier $2^{n-m} \cdot k + i$ is weighted by an SCQS code such that a symbol on subcarrier $2^{n-m} \cdot k + i$ is multiplied with the k-th chip of the SCQS code, denoted by $c_i^k$.

Referring back to FIG. 1, chips 117 mapped on subcarriers are fed into the IDFT unit 118 to be converted into time-domain data 119. A cyclic prefix (CP) is then added by the CP insertion unit 120 to the end of each OFDM frame. The time-domain data with CP 121 is then converted by the P/S converter 122 into a serial data 123 and transmitted over the wireless channel. It should be noted that the IDFT operation may be replaced by IFFT or other similar operations and the CP insertion may be performed after the IDFT output is converted into a serial data stream by the P/S converter 122 and the CP removal may be performed before the received signals are converted to a parallel data stream by the S/P converter 154.

Due to the structure of spread data, the IDFT operation can be simplified. The output 119 of the IDFT unit 118 comprises data symbols shifted by a particular phase. The phase is a function of corresponding input data subcarrier and data symbol indexes. Therefore, the IDFT operation can be replaced by the computation of the phase shift, which requires less computation.

For example, assume $n/2 < m \leq n$ and the orthogonal (or pseudo-orthogonal) spreading code part of the SCQS code are $\{1, 1, \ldots, 1\}$. Then, the h-th output of the IDFT unit 118 is given as follows:

$$IDFT(h) = d(i) \cdot e^{j \frac{(p \cdot 2^{n-m}+i)^2 - 2^{n-2}}{2^n} \pi}; \quad \text{Equation (8)}$$

where the value of h satisfies the following condition:

$h = 2^{n-m} \cdot p + i$, $p=0, \ldots, 2^m-1$, $i=0,1,\ldots,2^{n-m}-1$.

It is optional to perform the masking operation at the transmitter 110 and the corresponding demasking operation at the receiver 150. The purpose of masking is to reduce the inter-cell MAI. At the transmitter 110, the mixer 124 multiplies the data 123 with a masking code 125 before transmission. The corresponding demasking operation is performed at the receiver 150. A mixer 152 multiplies the received signals 128 with the conjugate 151 of the masking code 125 to generate a demasked data stream 153.

Referring to FIG. 1, the receiver 150 comprises an optional mixer 152, an S/P converter 154, a CP removing unit 156, a DFT unit 158, an equalizer 160 and a despreader (including multipliers 162, a summer 164 and a normalizer 166). The time-domain received data 128 are converted into parallel data stream 155 by the S/P converter 154 and the CP is removed by the CP removing unit 156. The performance of these operations may be switched as explained hereinabove. The output 157 from the CP removing unit 156 is then fed into the DFT unit 158 to be converted into frequency-domain data 159. Equalization on the frequency-domain data 159 is performed by the equalizer 160. As in a conventional OFDM system, a simple one-tap equalizer may be used for the frequency-domain data 159 at each subcarrier. It should be noted that the DFT operation may be replaced by an FFT operation or other similar operation.

Due to the structure of spread data, the DFT operation can also be simplified. The outputs 159 of the DFT unit are data symbols shifted by a particular phase. The phase is a function of corresponding input data subcarrier and data symbol indexes. Therefore, the DFT operation can be replaced by the computation of the phase shift, which requires less computation. The way it is done is similar, but opposite, to the IDFT operation at the transmitter side.

The equalized data is despread at the frequency-domain. The output 161 at each subcarrier after equalization is multiplied by the multipliers 162 with the conjugate 168 of the corresponding chip of the SCQS code, $c_i^k$, $k=0,1,\ldots,2^m-1$, used at the transmitter 110. Then, the multiplication outputs 163 at all subcarriers are summed up by the summer 164 and the summed output 165 is normalized by the normalizer 166 by the spreading factor of the SCQS code to recover the data 167.

The receiver 150 may further include a block linear equalizer or a joint detector (not shown) for processing the output of the despreader. Any type of block linear equalizer or joint detector may be used. One conventional configuration for a block linear equalizer or a joint detector is the minimum mean square error (MMSE) block linear equalizer. In this case, a channel matrix H is established and computed for subcarriers, and equalization is performed using the established channel matrix such that:

$$\vec{d} = (H^H H + \sigma^2 I)^{-1} H^H \vec{r}; \quad \text{Equation (9)}$$

where H is the channel matrix, $\vec{r}$ is the received signal in subcarriers and $\vec{d}$ is the equalized data vector in subcarriers.

For uplink operation, it is preferred to keep a constant envelope after IDFT operation, which allows use of an efficient and inexpensive power amplifier. In order to keep a constant envelope, the following conditions for a system with $N=2^n$ subcarriers have to be met. First, the spreading factor $2^m$ is limited by $\lfloor n/2 \rfloor \leq m \leq n$, wherein the term $\lfloor a \rfloor$ means the smallest integer larger than a. Second, for spreading factor $2^m$, only a fraction of orthogonal codes are used to combine with the quadratic phase sequence codes to generate the SCQS codes that yield constant envelope. For example, in the case of Newman phase code and Hadamard code, only the first $2^{\lceil m/2 \rceil}$ codes of the Hadamard code sets (of size $2^m$) are used to combine with the Newman phase sequence code to generate the SCQS codes. The term $\lceil b \rceil$ means the largest integer smaller than b.

As stated above, as long as the number of users in the system is no more than N/L, there is no MAI and there is no need to implement multi-user detection (MUD). When the number of users in the system is more than N/L, then there will be MAI and MUD may be implemented. The MAI will be more benign than conventional CDMA system with the same number of users.

Suppose that there are M users in the system. The number of users for MUD in the conventional CDMA system will be M. However, the number of users for MUD in the OFDM-CDMA system in accordance with the present invention will be $\lceil M/L \rceil$, which is reduced by a scale of L as compared to a conventional CDMA system. In this way, the complexity of MUD operation is much lower than the MUD in a prior art CDMA system. It is also possible to use multiple antennas at the transmitter and/or receiver.

Figure 5:
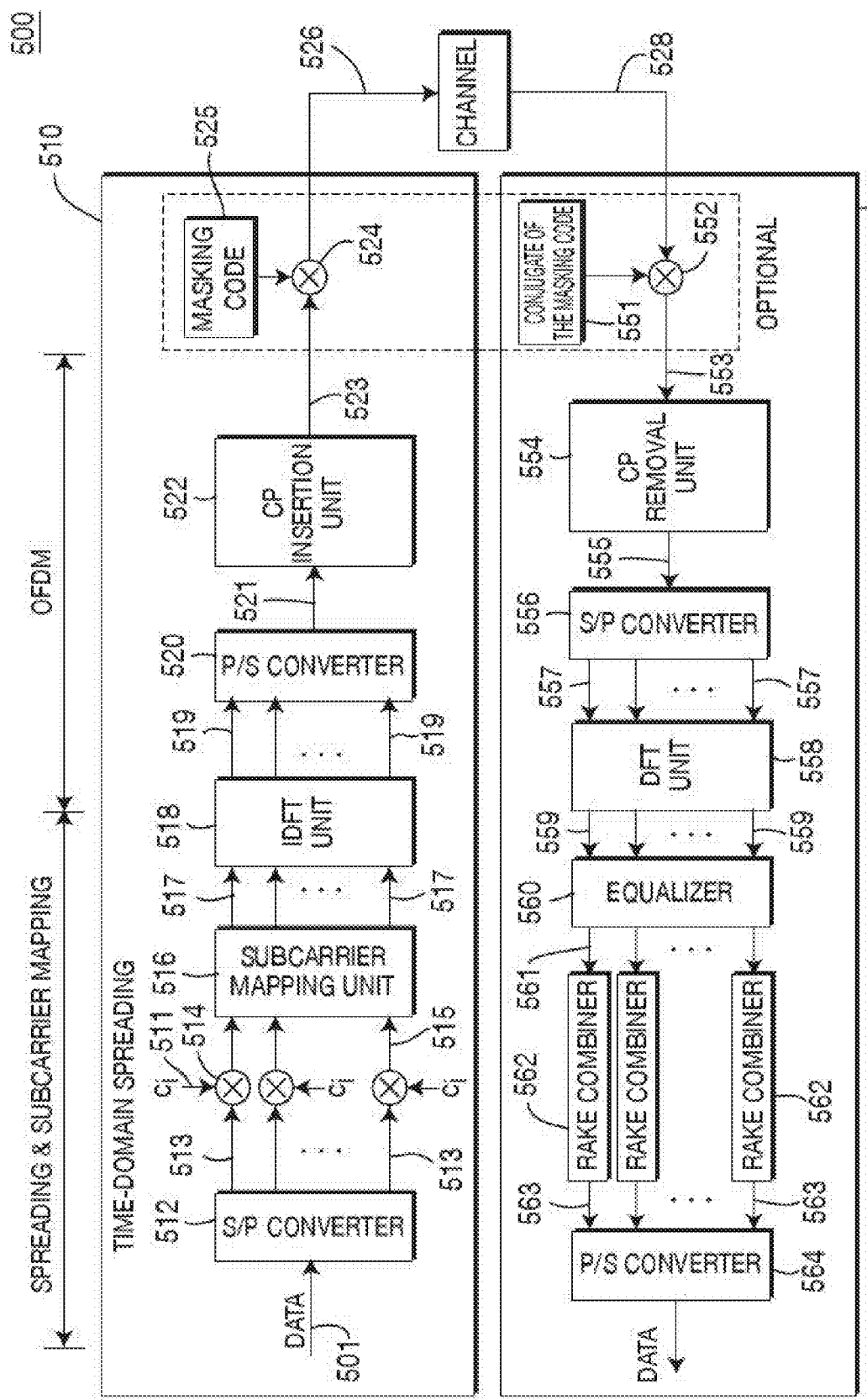
FIG. 5 is a block diagram of an OFDM-CDMA system in accordance with another embodiment of the present invention.

FIG. 5 is a block diagram of an OFDM-CDMA system 500, (multi-carrier direct sequence (MC-DS) CDMA system), in accordance with a second embodiment of the present invention. The system 500 comprises a transmitter 510 and a receiver 550. The transmitter 510 comprises an S/P converter 512, a plurality of multipliers 514, a sub-carrier mapping unit 516, an IDFT unit 518, a P/S converter 520, a CP insertion unit 522 and an optional mixer 524. If there are $N=2^n$ subcarriers in the system 500, the N consecutive data symbols 501 of the user i are converted from serial to N parallel symbols 513 by the S/P converter 512. The j-th data symbol of the N parallel data symbols 513 of the user i is denoted by $d^j(i)$, where j=0, 1, . . . , N−1. The SCQS code used by the user i is denoted by $c_i$. Each of the N parallel data symbols 513 is spread in time-domain using the SCQS code $c_i$ 511. The spreading factor of the SCQS code $c_i$ is $2^m$ ($0 \leq m \leq n$), therefore each data symbol 513 is spread by the SCQS code $c_i$ 511 into $2^m$ chips 515.

At each chip duration, one chip of each of the N data symbols $d^j(i)$ is transmitted on its corresponding subcarrier j. One user can use all of $2^n$ subcarriers in the system. Therefore, the number of data symbols that can be transmitted by one user in one OFDM frame is $2^n$.

The chips 515 are mapped to subcarriers by the subcarrier mapping unit 516. Chips 517 on subcarriers are fed into the IDFT unit 518, and converted into time-domain data 519. The time-domain data 519 are converted from parallel into serial data 521 by the P/S converter 520, and a CP is added to the end of each frame by the CP insertion unit 522. The data with CP 523 is transmitted over the wireless channel. It is equivalent to perform the conventional DS-CDMA operation on each subcarrier independently using the SCQS code, and DS-CDMA signals on subcarriers are transmitted in parallel using OFDM structure.

The receiver 550 comprises a CP removal unit 554, an S/P converter 556, a DFT unit 558, an equalizer 560, a plurality of rake combiners 562, and a P/S converter 564. First, the CP is removed by the CP removing unit 554 from the received data 528 via the wireless channel. The data 555 is then converted from serial to parallel data 557 by the S/P converter 556. The parallel data 557 is fed into the DFT unit 558, and converted to frequency-domain data 559. Then, equalization is applied to the frequency-domain data 559 by the equalizer 560. As in a conventional OFDM system, a simple one-tap equalizer may be used at each subcarrier.

Data 561 on each subcarrier after equalization is recovered by Rake combiners 562, (which include despreaders), in the time-domain. Then, parallel data symbols 563 yielded by each Rake combiners 562 are parallel-to-serial converted by the P/S converter 564 to recover the transmitted data.

As in the first embodiment of FIG. 1, it is optional to perform a masking operation at the transmitter 510 and the corresponding demasking operation at the receiver 550 to reduce the intercell MAI. The mixer 524 multiplies output 523 from the CP insertion unit 522 with a masking code 525 before transmission. The mixer 552 of the receiver 550 multiplies the received signals 528 with the conjugate 551 of the masking code used at the transmitter 510.

Figure 6:
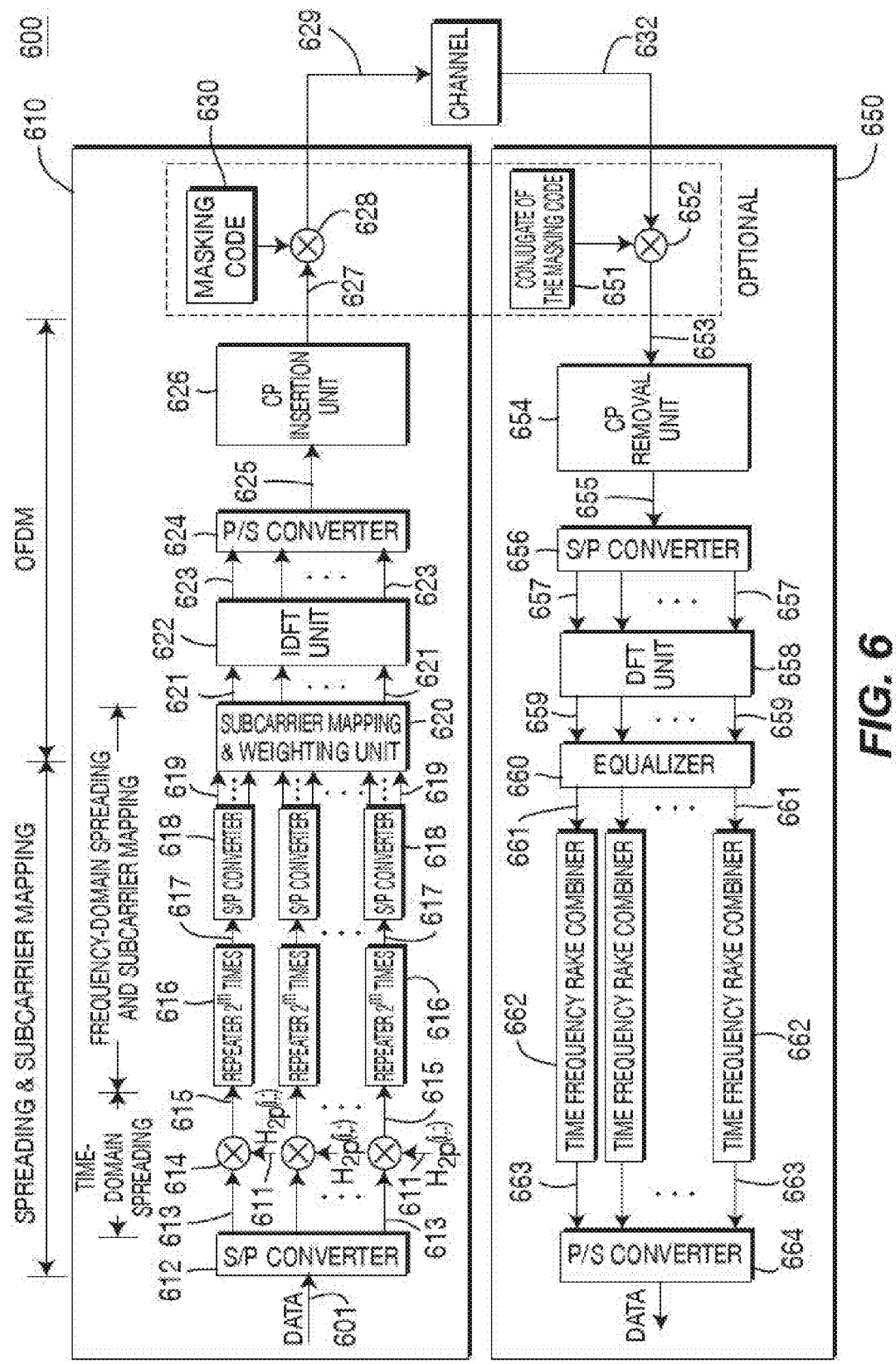
FIG. 6 is a block diagram of an OFDM-CDMA system in accordance with yet another embodiment of the present invention.

FIG. 6 is a block diagram of an OFDM-CDMA system 600 in accordance with a third embodiment of the present invention. The system 600 comprises a transmitter 610 and a receiver 650. The transmitter 610 includes an S/P converter 612, a plurality of multipliers 614, a plurality of repeaters 616, a plurality of S/P converters 618, a subcarrier mapping and weighting unit 620, an IDFT unit 622, a P/S converter 624, a CP insertion unit 626 and an optional mixer 628. In accordance with the third embodiment, the input data symbol is spread twice, once at the time-domain and the other at the frequency-domain. Assume the total number of subcarriers is $2^n$ and the spreading factors used in the time-domain and frequency-domain spreading are $2^p$ and $2^m$, respectively. The $N_T$ consecutive data symbols 601 of the user i are converted from serial to parallel $N_T$ symbols 613 by the S/P converter 612. The value of $N_T$ equals to $2^{n-m}$. The j-th data symbol of the $N_T$ parallel data symbols 613 of the user i is denoted by $d^j(i)$, where j=0, 1, . . . , N−1. The time-domain spreading code 611 used by the user i is denoted by $H_{2^p}(i,:)$. Each of the $N_T$ parallel data symbols 613 is then spread in the time-domain by the multipliers 614 by multiplying the symbols 613 with the time-domain spreading code $H_{2^p}(i,:)$ 611. The spreading factor of the time domain spreading code $H_{2^p}(i,:)$ is $2^p$ as defined in Equations (3) and (4). Each data symbol 613 is spread into $2^p$ chips and $N_T$ parallel $2^p$ chip streams 615 are generated.

After the time-domain spreading, a frequency-domain spreading is performed. Given the user i, for each chip stream j, (corresponding to the j-th data symbols of the $N_T$ data symbols), at each chip duration, each chip of the $N_T$ chip streams is repeated $2^m$ times by the repeater 616 and the $2^m$ repeated chips are converted into parallel $2^m$ chips 619 by the S/P converter 618. The $2^m$ chips are then mapped to $2^m$ equaldistant subcarriers sequentially by the subcarrier mapping and weighting unit 620. The distance between each subcarrier is $2^{n-m}$ subcarriers. Subcarrier mapping is performed sequentially such that the repeated chips from the j-th chip stream are mapped to subcarriers $2^{n-m} \cdot k+j$, (k=0,1, . . . , $2^m-1$, j= 0,1, . . . , $2^{n-m}-1$). Before the IDFT operation, a chip on each subcarrier $2^{n-m} \cdot k+j$ is weighted by the k-th chip of the SCQS code $c_i$, denoted by $c_i^k$.

One user can use all of $2^n$ subcarriers in the system. Therefore, the number of data symbols that can be transmitted by one user in one OFDM frame is $2^{n-m}$.

Figure 7:
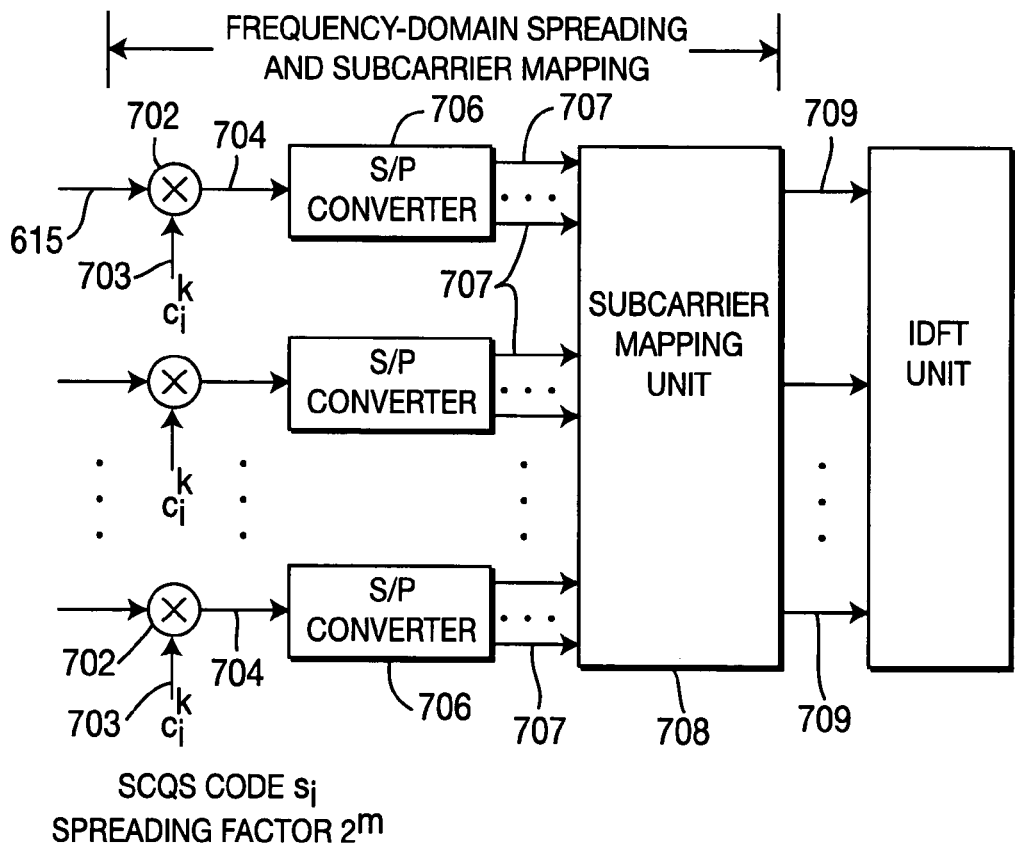
FIG. 7 shows an alternative way for the frequency-domain spreading and subcarrier mapping in a system of FIG. 6.

FIG. 7 shows an alternative way for the frequency-domain spreading and subcarrier mapping in a system of FIG. 6. Instead of repeating the chips $2^m$ times, the chips 615 are directly spread by the frequency-domain spreading code $c_i^k$.

Given the user i, for each chip stream j, (corresponding to the j-th data symbols of the $N_T$ data symbols), at each chip duration, each of the chips 615 is spread by the SCQS code $c_i^k$ 703 into $2^m$ chips 704 by the multipliers 702 and the frequency-domain spread chips 704 are converted into $2^m$ parallel chips 707 by the S/P converter 706. These parallel chips 707 are then mapped to $2^m$ equal-distant subcarriers 709 by the subcarrier mapping unit 708 sequentially, as explained hereinabove. The distance between each subcarrier is $2^{n-m}$ subcarriers. Subcarrier mapping is performed sequentially such that the repeated chips from the j-th chip stream are mapped to subcarriers $2^{n-m} \cdot k + j$, (k=0,1, ..., $2^m-1$, j=0,1, ..., $2^{n-m}-1$).

Referring again to FIG. 6, chips 621 mapped on subcarriers are fed into the IDFT unit 622, and converted into time-domain data 623. The time-domain data 623 is converted from parallel data into serial data 625 by the P/S converter 624, and a CP is added to the end of each frame of the data 625 by the CP insertion unit 626. The data with the CP 627 is transmitted over the wireless channel.

The receiver 650 includes an optional mixer 652, a CP removal unit 654, an S/P converter 656, a DFT unit 658, an equalizer 660, a plurality of time-frequency Rake combiners 662 and a P/S converter 664. At the receiver 650 side, the CP is removed by the CP removal unit 654 from the received data 632 via the wireless channel. The data 655 is then converted from serial to parallel data 657 by the S/P converter 656. The parallel data 657 is fed into the DFT unit 658, and converted to frequency-domain data 659. Then, equalization is applied to the frequency-domain data 659 by the equalizer 660. As in a conventional OFDM system, a simple one-tap equalizer may be used at each subcarrier.

After equalization, data 661 on each subcarrier is recovered by time-frequency Rake combiners 662, which will be explained in detail hereinafter. Parallel data symbols 663 yielded by each of the time-frequency Rake combiners 662 are then parallel-to-serial converted by the P/S converter 664 to recover the transmitted data.

Figure 8:
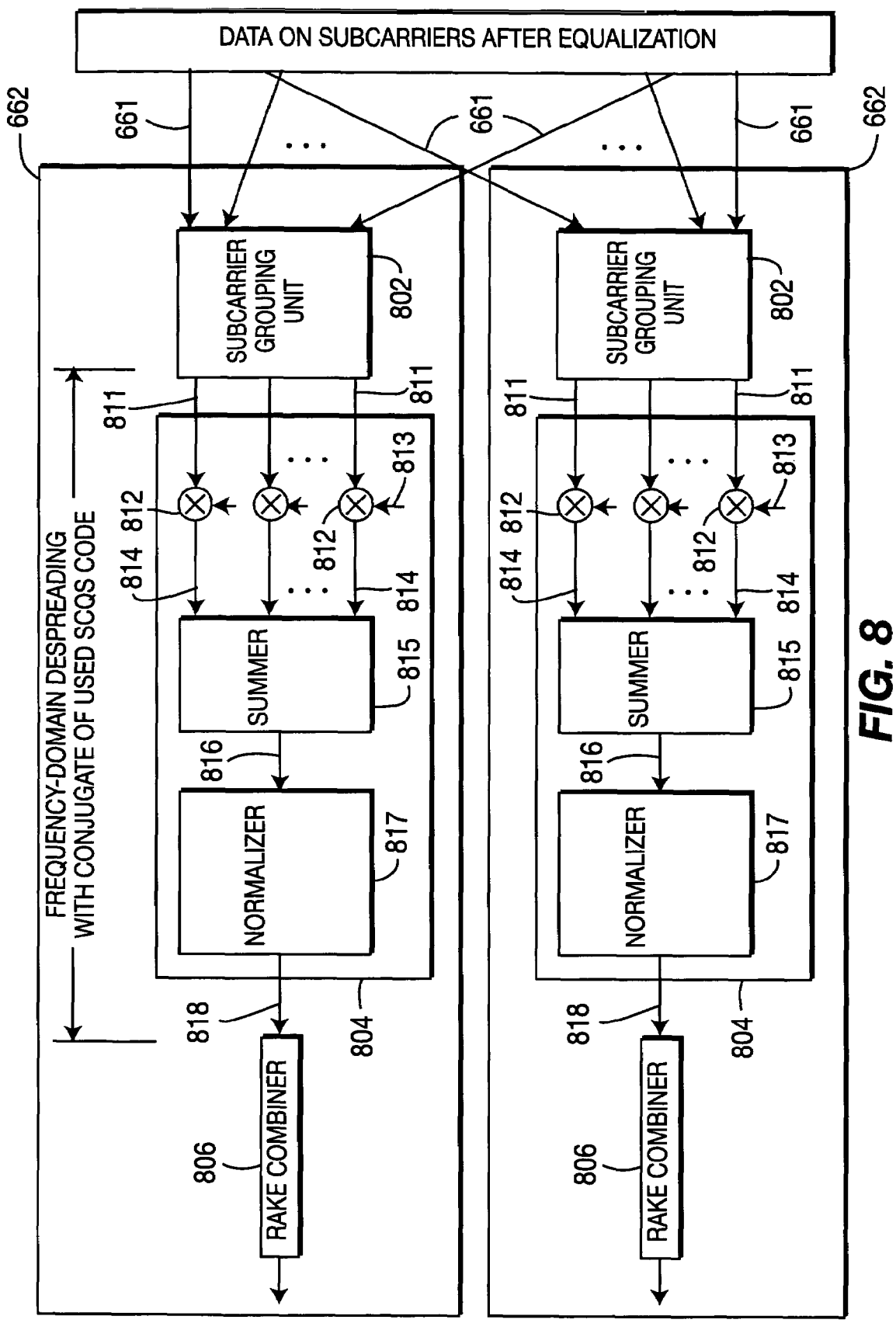
FIG. 8 is a block diagram of an exemplary time-frequency Rake combiner in accordance with the present invention.

A time-frequency Rake combiner 662 is a Rake combiner that performs processing at both the time and frequency domains in order to recover the data that is spread in both the time and frequency domains at the transmitter. FIG. 8 shows exemplary time-frequency Rake combiners 662. It should be noted that the time-frequency Rake combiners 662 may be implemented in many different ways and the configuration shown in FIG. 8 is provided as an example, not as a limitation, to those of ordinary skill in the art.

Each time-frequency Rake combiner 662 comprises a subcarrier grouping unit 802, a despreader 804 and a Rake combiner 806. For each data symbol j (j=0,1, ..., $2^{n-m}-1$) of $N_T$ consecutive data symbols, the subcarrier grouping unit 802 collects the following chips on subcarriers 661 $2^{n-m} \cdot k + j$, (k=0,1, ..., $2^m-1$), totaling $2^m$ chips. Then, the despreader 804 performs frequency-domain despreading to the chips on the $2^m$ subcarriers. The despreader 804 includes a plurality of multipliers 812 for multiplying conjugate 813 of the SCQS codes to the collected chips 811, a summer 815 for summing the multiplication outputs 814, and a normalizer 817 for normalizing the summed output 816. After the frequency-domain despreading, chips on $2^n$ subcarriers become chips on $N_T$ parallel chip streams 818. To recover the j-th data symbol of the user i, time-domain Rake combining is performed by the Rake combiner 806 on the corresponding chip stream 818.

Referring again to FIG. 6, it is optional to perform a masking operation at the transmitter 610 and the corresponding demasking operation at the receiver 650 to reduce the inter-cell MAI. The mixer 628 multiplies output 627 from the CP insertion unit 626 with a masking code 630 before transmission. The mixer 652 of the receiver 650 multiplies the received signals 632 with the conjugate 651 of the masking code used at the transmitter 610.

For all the embodiments described hereinbefore, a predetermined data vector {d(i)}, (i.e., pre-known signals), may be transmitted. In this way, the uplink transmitted signals can be used as a preamble for Random Access Channel (RACH) or uplink pilot signals. For example, a predetermined data vector {d(i)} of all is, {1,1, ..., 1}, may be transmitted.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A transmitter device comprising:
   at least one circuit configured to produce a first sequence; wherein the first sequence is derived at least from a plurality of symbols of a user device, a second sequence and a third sequence; wherein the second sequence is at least one of a plurality of shifted versions of a fourth sequence having a plurality of phases; wherein the third sequence is an orthogonal sequence; and
   the at least one circuit is further configured to transmit an orthogonal frequency division multiplexed (OFDM) based signal derived from at least the first sequence; wherein the first sequence is carried by a plurality of subcarriers at a particular time.

2. The transmitter device of claim 1 wherein the first sequence is derived by at least multiplying at least one data symbol of the plurality of data symbols with one of the shifted versions of the fourth sequence.

3. The transmitter device of claim 1 wherein the at least one circuit is further configured to derive the first sequence using orthogonal sequences having a plurality of lengths.

4. The transmitter device of claim 1 wherein the one orthogonal sequence is assigned to the user device.

5. The transmitter device of claim 4 wherein other user devices are assigned different orthogonal sequences of the plurality of orthogonal sequences.

6. The transmitter device of claim 4 wherein the one orthogonal sequence is a Walsh code.

7. The transmitter device of claim 1 wherein the first sequence is further derived from a fifth sequence.

8. The transmitter device of claim 7 wherein the fifth sequence is a mask sequence.

9. The transmitter device of claim 1 wherein the at least one circuit is further configured to put the first sequence onto the plurality of subcarriers, inverse discrete Fourier transform the plurality of subcarriers to generate a time-domain signal; and insert a cyclic prefix into the time-domain signal.

10. A method for transmitting an Orthogonal Frequency Division multiplexing (OFDM)-based signal in wireless communications, the method comprising:
   producing, by a transmitting device, a first sequence; wherein the first sequence is derived at least from a plurality of symbols of a user device, a second sequence and a third sequence; wherein the second sequence is at least one of a plurality of shifted versions of a fourth sequence having a plurality of phases; wherein the third sequence is an orthogonal sequence; and
   transmitting, by the transmitting device, an orthogonal frequency division multiplexed (OFDM) based signal derived from at least the first sequence; wherein the first sequence is carried by a plurality of subcarriers at a particular time.

11. The method of claim 10 wherein the first sequence is derived by at least multiplying at least one data symbol of the plurality of data symbols with one of the shifted versions of the fourth sequence.

12. The method of claim 10 wherein the producing a first sequence includes deriving the first sequence using orthogonal sequences having a plurality of lengths.

13. The method of claim 10 wherein the one orthogonal sequence is assigned to the user device.

14. The method of claim 13 wherein other user devices are assigned different orthogonal sequences of the plurality of orthogonal sequences.

15. The method of claim 13 wherein the one orthogonal sequence is a Walsh code.

16. The method of claim 10 wherein the first sequence is further derived from a fifth sequence.

17. The method of claim 16 wherein the fifth sequence is a mask sequence.

18. The method of claim 10 further comprising:
putting the first sequence onto the plurality of subcarriers, producing a time-domain signal by inverse discrete Fourier transform of the plurality of subcarriers; and
inserting a cyclic prefix into the time-domain signal.

19. A receiving device comprising:
at least one circuit configured to receive an orthogonal frequency division multiplexed (OFDM) based signal derived from at least a first sequence; wherein the first sequence is carried by a plurality of subcarriers at a particular time; and
the at least one circuit further configured to recover symbols from the first sequence; wherein the first sequence was derived at least from a plurality of symbols of a user device, a second sequence and a third sequence; wherein the second sequence is at least one of a plurality of shifted versions of a fourth sequence having a plurality of phases; wherein the third sequence is an orthogonal sequence.

20. The receiving device of claim 19 wherein the first sequence was derived by at least multiplying at least one data symbol of the plurality of data symbols with one of the shifted versions of the fourth sequence.

21. The receiving device of claim 19 wherein the orthogonal sequence is a Walsh code.

22. The receiving device of claim 19 wherein the first sequence was further derived from a fifth sequence.

23. The receiving device of claim 19 wherein the at least one circuit is further configured to remove a cyclic prefix from the received OFDM based signal, discrete Fourier transform a result of the cyclic prefix removal; wherein the recover symbols is derived from at least a result of the discrete Fourier transform.

* * * * *

UNITED STATES PATENT AND TRADEMARK OFFICE
CERTIFICATE OF CORRECTION

PATENT NO. : 7,876,806 B2  
APPLICATION NO. : 11/385168  
DATED : January 25, 2011  
INVENTOR(S) : Tsai et al.

Page 1 of 1

It is certified that error appears in the above-identified patent and that said Letters Patent is hereby corrected as shown below:

ON THE TITLE PAGE

At item (75) "Inventors", page 1, left column delete:

"Jung-Lin Pan, Selden, NY (US);
Guodong Zhang, Farmingdale, NY
(US); Yingming Tsai, Boonton, NJ (US)"

and insert therefor:

--Yingming Tsai, Boonton, NJ (US)
Guodong Zhang, Farmingdale, NY (US);
Jung-Lin Pan, Selden, NY (US)--

Signed and Sealed this
Tenth Day of May, 2011

David J. Kappos
*Director of the United States Patent and Trademark Office*